(12) United States Patent
Agraharam et al.

(10) Patent No.: US 6,414,707 B1
(45) Date of Patent: *Jul. 2, 2002

(54) APPARATUS AND METHOD FOR INCORPORATING VIRTUAL VIDEO CONFERENCING ENVIRONMENTS

(75) Inventors: Sanjay Agraharam, Marlboro; Robert Edward Markowitz, Glen Rock; Kenneth H. Rosen, Middletown; Joel A. Winthrop, Little Silver, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,014

(22) Filed: Oct. 16, 1998

(51) Int. Cl.$^7$ ................................................ H04N 7/14
(52) U.S. Cl. .................................. 348/14.07; 348/14.09
(58) Field of Search ............................. 348/14–17, 586, 348/589; 345/113–114, 328–330, 435; 379/93.21, 93.23, 202; 370/260; 709/204; 707/8–10; 375/240.03; 725/105, 137

(56) References Cited

U.S. PATENT DOCUMENTS

| 4,712,231 A | | 12/1987 | Julstrom ..................... 379/202 |
|---|---|---|---|
| 5,315,633 A | | 5/1994 | Champa ....................... 348/16 |
| 5,402,418 A | | 3/1995 | Shibata et al. ................ 348/15 |
| 5,473,363 A | | 12/1995 | Ng et al. ...................... 348/15 |
| 5,684,527 A | | 11/1997 | Terui et al. ................... 348/15 |
| 5,751,337 A | * | 5/1998 | Allen et al. .................. 379/202 |
| 5,781,198 A | * | 7/1998 | Korn .......................... 345/435 |
| 5,781,245 A | * | 7/1998 | Van Der Weij et al. .... 725/105 |

(List continued on next page.)

FOREIGN PATENT DOCUMENTS

JP 2128584 * 5/1990 ............ H04N/7/14

OTHER PUBLICATIONS

J. Schwartz, "Talking Heads," *Communications Week*, Jan. 21, 1991, n. 335, 35.

G. Y. Georgiannakis, P.E. et al., "Design of an Immersive Teleconferencing Application," Institute of Computer Science, 4$^{th}$ and Department of Computer Science, University of Crete, European Workshop IDMS '96, Berlin, Germany, Mar. 4–6, 1996, Proceedings, pp. 117–130.

(List continued on next page.)

*Primary Examiner*—Duc Nguyen
*Assistant Examiner*—George Eng
(74) *Attorney, Agent, or Firm*—Oliff & Berridge, PLC

(57) ABSTRACT

The present invention provides an apparatus and method for conducting a video conference. The video conference apparatus is connected to at least one network. The video conference apparatus includes a MCU, an environment processor, a user database interface and an environment database interface. When users log onto the video conference apparatus, it is determined whether each user has designated an alternative environment from that normally detected by the camera device during the video conference. If the user has designated an alternative environment, the environment processor obtains the environment from the environment database and the video conference apparatus uses the designated environment during the video conference. However, if the user has not designated an alternative environment, the environment processor sends a request message providing a listing of possible environments which may be used during the video conference. Thus, the user may select a desired environment from the listing and use it during the video conference. If the user does not wish to select an alternative environment, a default environment corresponding to the environment normally detected through the camera device is used during the video conference.

24 Claims, 4 Drawing Sheets

U.S. PATENT DOCUMENTS

| | | | | | |
|---|---|---|---|---|---|
| 5,838,775 | A | * | 11/1998 | Montalbano | 379/93.23 |
| 5,953,050 | A | * | 9/1999 | Kamata et al. | 348/15 |
| 5,999,208 | A | * | 12/1999 | McNerney et al. | 348/15 |
| 6,047,288 | A | * | 4/2000 | Kurosawa et al. | 707/9 |
| 6,188,726 | B1 | * | 2/2001 | Hirabayashi | 375/240.03 |

OTHER PUBLICATIONS

Tatsuhide Arakaki et al., "Development of Multipoint Teleconference System Using Multipoint Control Unit (MCU)," NEC Corporation, Tokyo, Japan, pp. 132–137.

Yangzhen Zou et al., "MCU System Software in Video Conference Network," 1996 International Conference on Communication Technology Proceedings, May 5–7, 1996, pp. 173–177.

Ming–Ting Sun et al., "Video Bridging for Multipoint Video Conferencing," University of Washington, Department of Electrical Engineering & Bellcore, vol. 8, pp. 427–431 (1997).

Mark J. Koenig et al., "MCUs Help Take the Worry Out of Being There,", *AT&T Technology*, vol. 9, No. 4, pp. 12–15.

Fumio Kishino et al., "Enhanced Video Teleconferencing," NTT Human Interface Laboratories, NTT Telecommunications Networks Laboratories, NNT Research and Development Headquarters and NTT Video and Record Communications Division, 1989, pp. 67–79.

* cited by examiner

DO YOU WISH TO USE THE
PREFERRED ENVIRONMENT ?

YES

NO

WIDJET INC.

W.O.L. WORLD OIL LEAGUE

DEFAULT

PLEASE SELECT THE ENVIRONMENT FOR
USE DURING THE VIDEO CONFERENCE

APPARATUS AND METHOD FOR INCORPORATING VIRTUAL VIDEO CONFERENCING ENVIRONMENTS

BACKGROUND OF THE INVENTION

1. Field of Invention

The present invention provides an apparatus and method for conducting virtual meetings in which the environment for the virtual meeting may be chosen and specified by at least one of the participants in the virtual meeting.

2. Description of Related Art

Video conference systems are generally known in the art which provide point to point video conferencing capability between parties in different locations. These systems include, for example, H.320 protocol based systems such as Intel's ProShare™. These systems use the H.320 protocol to deliver audio, video and data from one conferencing endpoint to another.

When more than two parties are going to participate in a conference call they commonly use a bridge known as a multipoint control unit (MCU). A known MCU based system is disclosed in U.S. Pat. No. 5,684,527 issued to Terui et al., which is hereby incorporated by reference. The MCU allows multiple parties to communicate over these systems and use various mechanisms, such as voice activation and motion detection, to determine which endpoint's picture to put on the screen at any moment in time.

These systems are limited to the use of video that is picked up by a camera device connected to the endpoint device. Thus, the user of the endpoint device has limited control over the environment in which his/her image is shown to the other participants in the video conference. Thus, there is a need for new technology that would allow the user to have increased control over the images which are transmitted to the other participants in a video conference.

SUMMARY OF THE INVENTION

In view of the above, the present invention provides an apparatus and method for conducting a video conference. The apparatus includes a video conference apparatus connected to at least one network. The video conference apparatus includes a MCU, an environment processor, a user database interface and an environment database interface. When users log onto the video conference apparatus, it is determined whether each user has designated an alternative environment for use during the video conference. If the user has designated an alternative environment, the environment processor obtains the environment from the environment database and the video conference apparatus uses the designated environment during the video conference.

However, if the user has not designated an alternative environment, the environment processor sends a request message providing a listing of possible environments which may be used during the video conference. Thus, the user may select a desired environment from the listing and use it during the video conference. If the user does not wish to select an alternative environment, a default environment corresponding to the environment normally detected through the camera device is used during the video conference.

These and other features and advantages of the present invention will be described in or are readily apparent from the following detailed description of the invention.

BRIEF DESCRIPTION OF THE DRAWINGS

The embodiments of the present invention will be described with reference to the following figures, wherein like numerals represent like elements, and wherein.

DETAILED DESCRIPTION OF THE INVENTION

Figure 1:
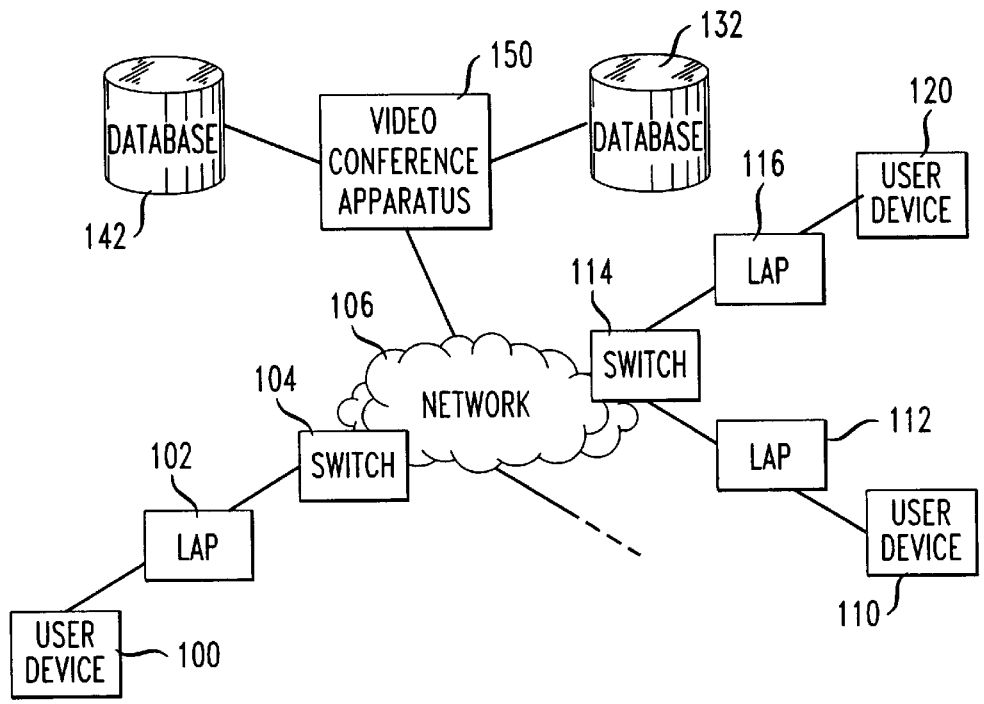
FIG. 1 shows a video conferencing network according to the present invention.

FIG. 1 shows a video conferencing system according to the present invention. The system includes user devices 100, 110 and 120 in connection with a network 106 through Local Access Providers (LAPs) 102, 112 and 116, and switches 104 and 114. The user devices 100, 110 and 120 communicate with one another via the network 106 and the video conference apparatus 150.

When a number of parties wish to conduct a video conference using the user devices 100, 110 and 120, each user must first log onto the video conference apparatus 150 using their respective user devices 100, 110 or 120. The user devices 100, 110 and 120 may be any such device that allows for the sending and receiving of video information and audio information. The user devices 100, 110 and 120 may further be capable of sending and receiving data and receiving input of user commands. For example, the user devices 100, 110 and 120 may include a video conferencing device, a personal computer, a video telephone, smart TV, and the like.

Once the user has logged onto the video conference apparatus 150, the video conference apparatus 150 retrieves information from the user database 132. The information retrieved may contain identifiers of preferred environments and a listing of identifiers of available environments. The environment may be a simple background, a virtual environment with which the user will interact, an animated environment, a moving background, and the like. For example, the environment may be a background depicting a company trademark or a virtual environment of an office in which the user sits behind a desk and interacts with virtual objects. Other types of environments may be used without departing from the spirit and scope of the present invention.

If the retrieved information includes a preferred environment, the user is asked whether they wish to use the preferred environment. If the information does not include a preferred environment or the user does not wish to use the preferred environment, the user is presented with a list of available environments from which he/she can select the environment they wish to use during the video conference. The video conference apparatus 150 then uses the selected environment with the user's image during the video conference.

Figure 2:
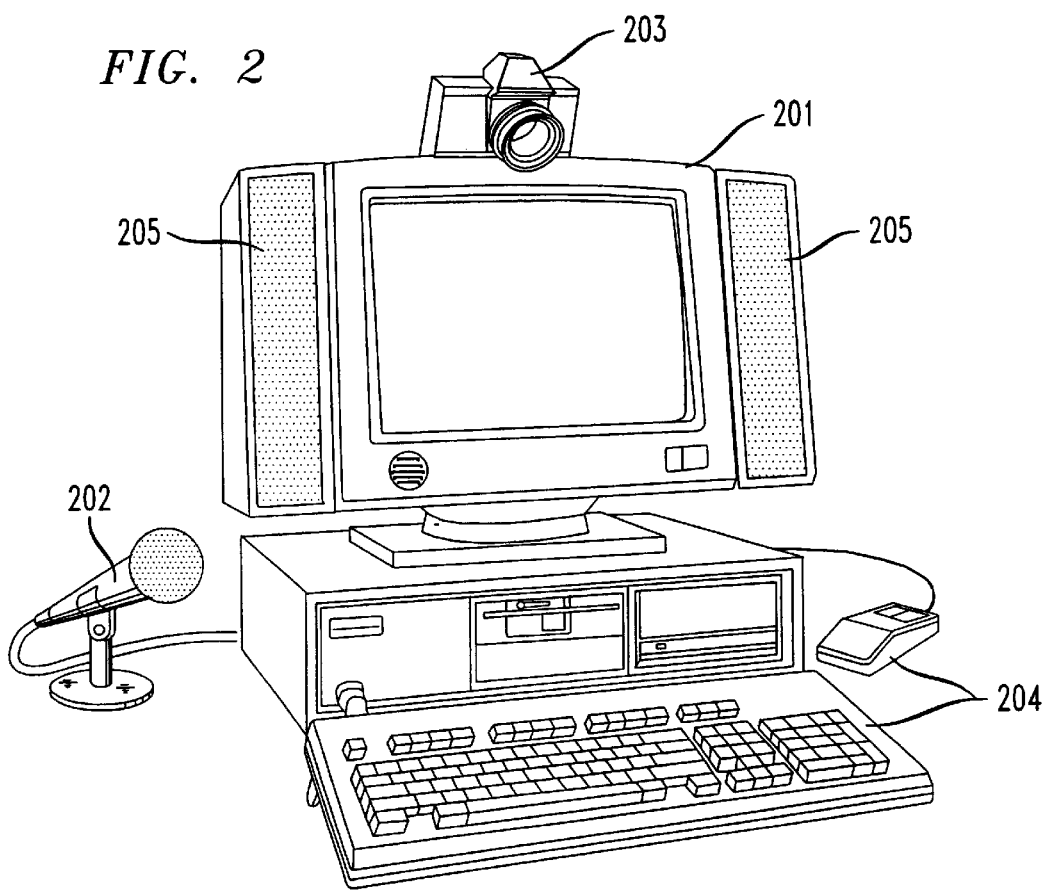
FIG. 2 is an example of a user device of FIG. 1.
Figure 3:
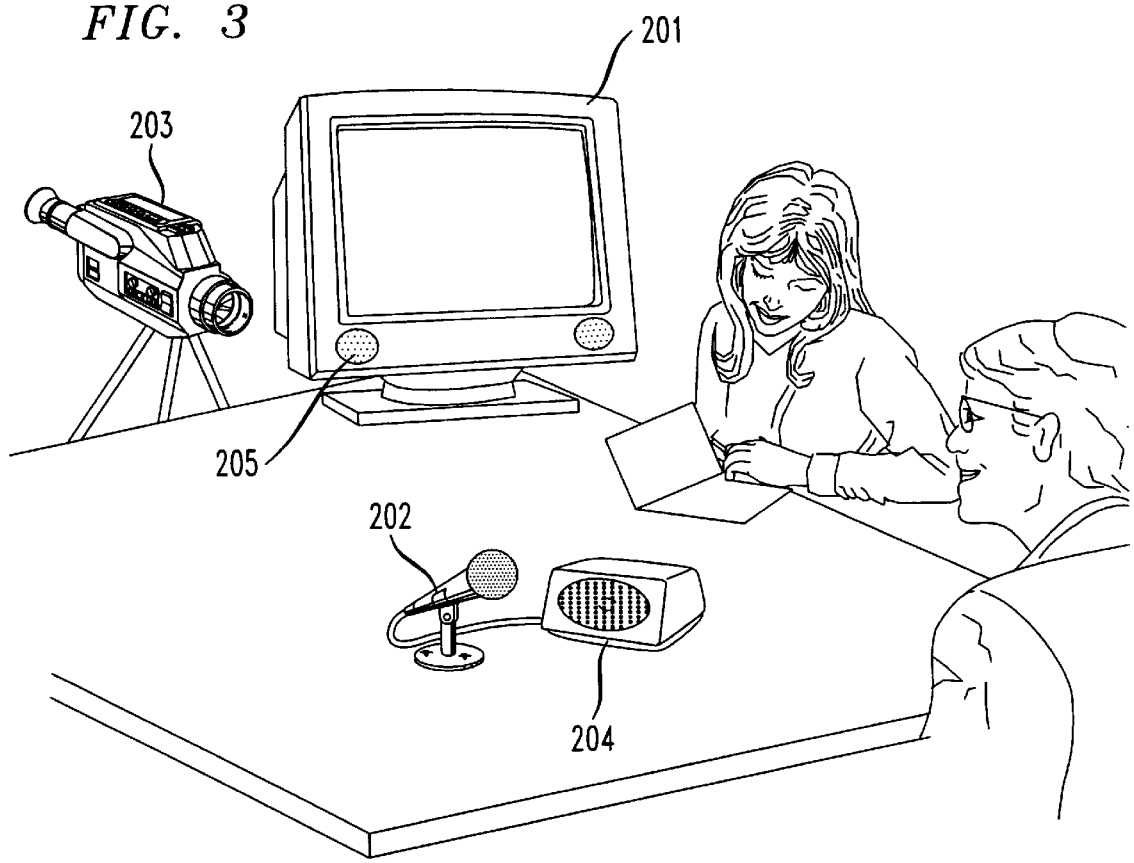
FIG. 3 is another example of a user device of FIG. 1.

FIGS. 2 and 3 show two examples of user devices that may be used with the present invention. FIG. 2 is a personal computer and FIG. 3 is a video conferencing device as is commonly known in the art. Each device includes a display 201, an audio input device 202, an image input device 203, a user interface 204 and an audio output device 205. The display 201 may include a computer monitor, television display, touchscreen display, LCD, and the like. The audio input device 202 may include, for example, a microphone, telephone receiver, and the like. The image input device 203 may be, for example, a video camera, digital still frame camera and the like. The user interface 204 may include, for example, a keyboard, pointing device, voice recognition device, and the like. The audio output device 205 may include, for example, speakers, subwoofers and the like.

The user logs onto the video conference apparatus 150 by inputting, through the user interface 204, the address of the video conference apparatus 150. The address may be, for example, a telephone number, a Universal Resource Locator (URL), TCP/IP address, Local Area Network (LAN) address, Wide Area Network (WAN) address, and the like. Upon entering the address of the video conference apparatus 150, the video conferencing signals from the user device 100, 110 or 120 are sent through the corresponding LAP 102, 112 or 116 and switch 104 or 114 to the video conference apparatus 150 via the network 106.

The LAPs 102, 112 and 116 may be any system or device that allows access to the network 106. The LAPs 102, 112 and 116 may be, for example, an Internet Access Provider such as America On-Line™, a Local Exchange Carrier as is typically found in telecommunications systems, and the like. The owner of the user device 100, 110 or 120 typically must subscribe to the provider of the LAP 102, 112 or 116 in order to obtain access to the network 106.

The switches 104 and 114 may be any system or device that facilitates the routing of signals through the network 106 from a source device to a destination device. The switches 104 and 114 may be, for example, Lucent Technologies Inc. 4ESS and 5ESS switches and the like.

The network 106 may be a single network or a plurality of networks of the same or different types. Thus, network 106 may be, for example, a single telecommunications network, a plurality of telecommunications networks, a data network, a plurality of data networks, or a combination of one or more data networks and telecommunications networks. The network 106 facilitates communication between the user devices 100, 110 and 120.

Figure 4:
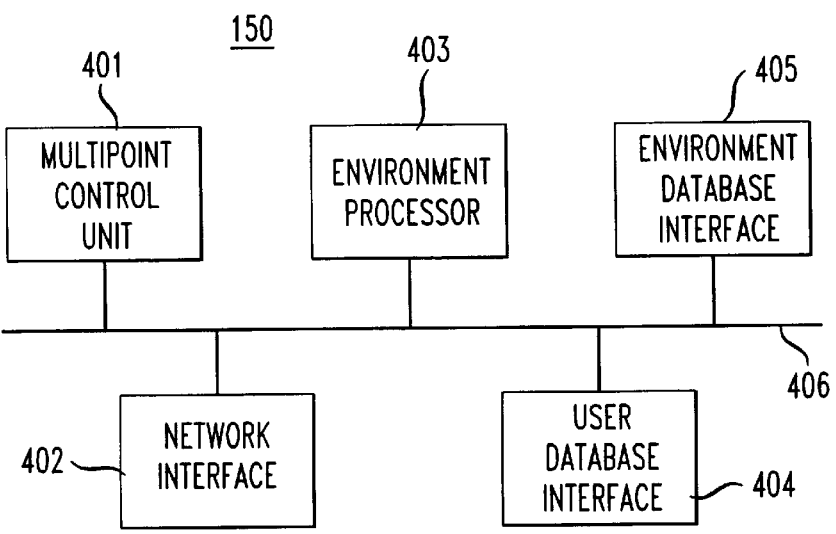
FIG. 4 is a block diagram of the video conference apparatus of FIG. 1.

FIG. 4 is a block diagram of the video conference apparatus 150 of FIG. 1. The video conference apparatus 150 includes a multipoint control unit (MCU) 401, a network interface 402, an environment processor 403, a user database interface 404, an environment database interface 405 and bus 406. The MCU 401 controls the operation of the video conference apparatus 150. The network interface 402 is used to pass signals between the video conference apparatus 150 and the network 106. The environment processor 403 performs the processing of video conference environment selections by users. The user database interface 404 and the environment database interface 405 facilitate the transfer of data between the video conference apparatus 150 and the user database 132 and environment database 142, respectively. Information is passed between the components of the video conference apparatus 150 via the bus 406.

When a user initiates a video conference by inputting the address of the video conference apparatus 150, the signals from the corresponding user device 100, 110 or 120 are received at the conference processor 150 at the network interface 402 and are sent to the MCU 401. The signals received from the user device 100, 110 or 120 include information identifying the user device from which they originate. This information may be included, for example, in the signals themselves or may be a separate signal, such as a startup signal or a header to the signals being sent from the user device.

Based on the identification information received from the user device 100, 110 or 120, the MCU 401 retrieves information corresponding to the identification information from the user database 132 through user database interface 404. The information retrieved from the user database 132 includes such information as the identity of the user device and various settings for the user device. These settings may include, for example, a list of environment identifiers for environments available to the user device identified by the identification information, a preferred environment for use with the video conference if the user has previously stored a preferred environment identifier in the user database 132, and the like.

Based on the information retrieved from the user database 132, the MCU 401 determines if a preferred environment has been set for the user device 100, 110 or 120 from which the signals originate. If a preferred environment has been set, the MCU 401 instructs the environment processor 403 to retrieve the preferred environment from the environment database 142 via the environment database interface 405.

Figure 5:
FIG. 5 is an example of a verification display according to the present invention.

The MCU 401 then sends a message to the user device 100, 110 or 120 verifying that the user wishes to use the preferred environment. The message may be in the form of an audible message, text message or graphical display on the display 201, a combination of audible message and text/graphic or the like. The audible message may be prerecorded or computer synthesized. For example, as shown in FIG. 5, the message may be a prerecorded message asking "Do you wish to use the preferred environment?" with a display of the environment identified by the environment identifier that has been set in the user database 132.

If the user decides to use the preferred environment, this environment is selected for use during the video conference. However, if the user does not wish to use the preferred environment, or if a preferred environment has not been established, the MCU 401 instructs the environment processor 403 to retrieve information from the environment database 142, via the environment database interface 405, corresponding to a list of available environments from the user database 132 for the user device 100, 110 or 120 identified by the identification information.

Figure 6:
FIG. 6 is an example of a display of the available environments for selection by a user in accordance with the present invention.
Figure 6:
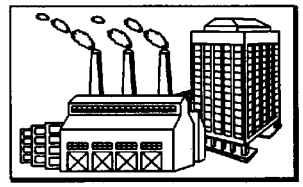
Figure 6:

The environment processor 403 then sends the information to the user device in the form of minimized displays, commonly known as thumbnail displays, of the available environments and a request message asking that the user choose one of the displayed environments for use with the video conference. This message may be audible, textual, graphical or a combination of any or all of these. For example, the message may be an audible or textual message stating "Please select the environment for use during the video conference." An example of this display is shown in FIG. 6.

The user may select the desired environment by, for example, clicking on a thumbnail display with a pointing device, entering a letter or number identifying the environment, speaking an identifier of the environment into the audio input device 202 (if the user device is equipped with voice recognition software), and the like. The list may also include the option for not choosing an alternative environment and thereby the video conference apparatus 150 would use a default environment such as the environment in which the user actually resides.

Alternatively, the default environment may be an environment provided to the video conference apparatus 150 from a location remote from both the video conference apparatus 150 and the user. For example, the environment may be obtained from an image pick-up device, such as a digital camera, video camera, and the like, in a location different from the user. In this way, the user may be seen as being in a different location from that in which he/she actually resides. The image pick-up device must be in communication with either the video conference apparatus 150 or the user device 100, 110 or 120.

Once the user has designated the environment which they wish to use, the video conference proceeds in a normal video conference mode using known head finding software to separate the talking head of the user from the environment. The talking head may then be superimposed on the alternative environment chosen by the user. In this way the user's image is displayed to the other participants in the video conference as being "in" the chosen environment.

Thus, a user may select an environment that is suitable for the video conference being conducted. For example, the user may select as an environment, the company trademark for a business meeting, household settings for family video conferences, and the like.

Figure 7:
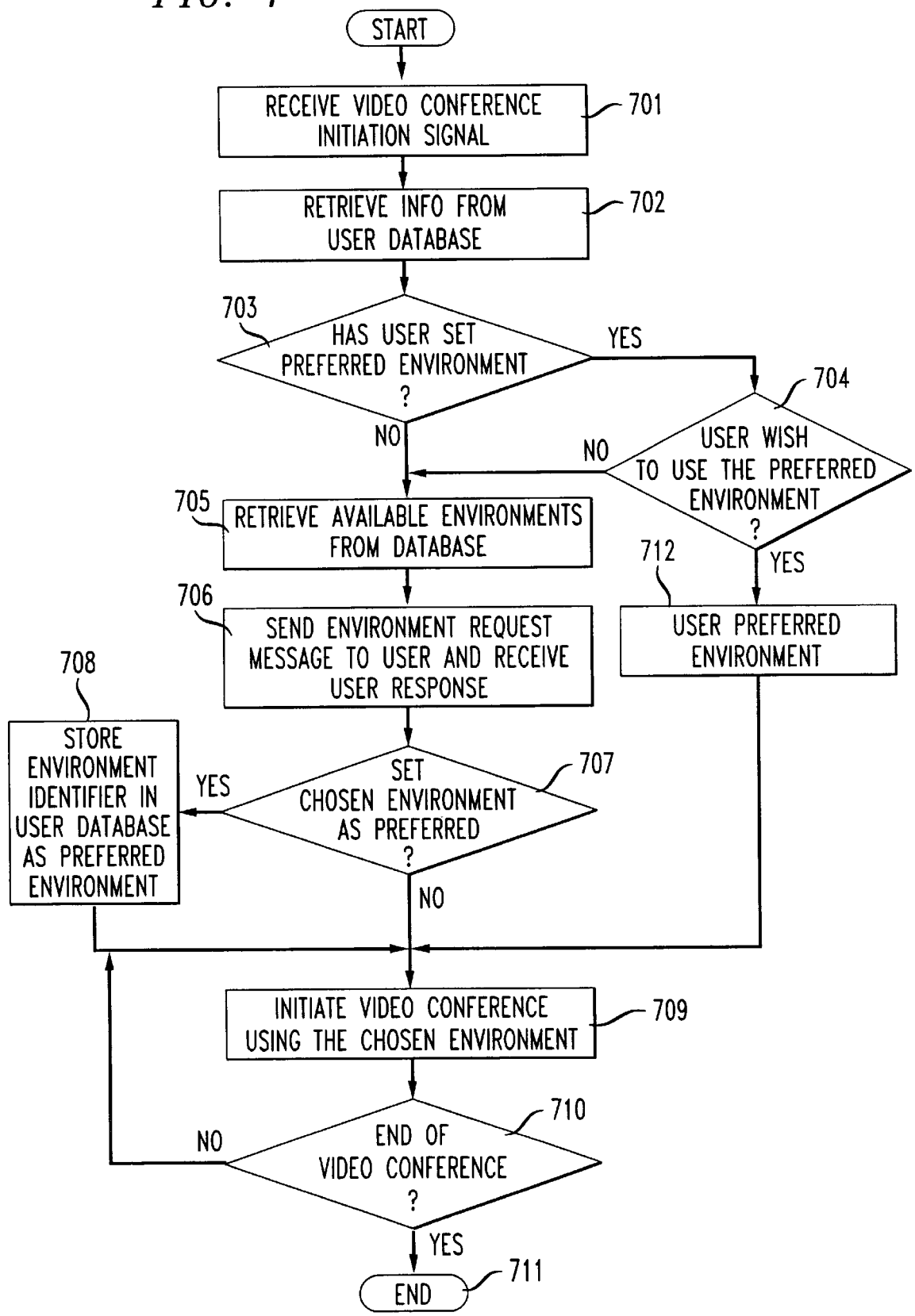
FIG. 7 is a flowchart of the operation of the video conference apparatus according to the present invention.

FIG. 7 is a flowchart of the operation of the video conference apparatus 150. In step 701, the video conference apparatus 150 receives video conference initiation signals from at least one of the user devices 100, 110 or 120 and goes to step 702. The initiation signals include identifying information identifying the user device 100, 110 or 120 from which they originate. In step 702, based on the identifying information received, the video conference apparatus 150 retrieves information from the user database 132 corresponding to the identifying information and goes to step 703. The information retrieved may include a preferred environment identifier previously set by the user.

In step 703, the video conference apparatus 150 determines if the information retrieved from the user database 132 includes a preferred environment identifier. If there is a preferred environment identifier, the video conference apparatus 150 goes to step 704; otherwise the video conference apparatus 150 goes to step 705. In step 704, the video conference apparatus 150 sends a message to the user device asking if the user wishes to use the preferred environment. If the user wishes to use the preferred environment, the video conference apparatus 150 goes to step 712; otherwise the video conference apparatus 150 goes to step 705. In step 712, the video conference apparatus 150 designates the preferred environment as the environment for use during the video conference.

In step 705, the video conference apparatus 150 retrieves available environments from the environment database 142 based on information retrieved from the user database 132 and goes to step 706. In step 706, the video conference apparatus 150 displays these environments to the user through the display 201 of the user device 100, 110 or 120, sends a request message asking the user to select the environment to use with the video conference, receives the user selection and goes to step 707.

In step 707, the video conference apparatus 150 sends a message to the user asking if the chosen environment is to be set as a preferred environment. If it is, the video conference apparatus 150 goes to step 708; otherwise the video conference apparatus 150 goes to step 709. In step 708, the video conference apparatus 150 stores the environment identifier for the chosen environment in the user database 132 as a preferred environment identifier and goes to step 709. In step 709, the video conference apparatus 150 initiates the video conference using the chosen or preferred environment and goes to step 710. In step 710, the video conference apparatus 150 monitors for an end condition of the video conference. If an end condition is detected, the video conference apparatus 150 goes to step 711 and ends; otherwise the video conference apparatus 150 goes back to step 709.

The video conference apparatus 150 may further send different alternative environments to the various parties involved in the video conference. When the user selects the alternative environment for use during the video conference, the user may also select, from a listing of the other parties or party locations involved in the video conference, the party or parties that are to receive that alternative environment. A different video conference data stream is provided to each of the parties receiving different alternative environments through the video conference apparatus 150 under the control of the multipoint control unit 401. Thus, the video conference apparatus 150 may send an environment corresponding to an office setting to a first party and an environment corresponding to a vacation setting to a second party. The user will be perceived by the first and second parties as being located "in" the office environment and vacation environments, respectively.

While the above embodiments describe the present invention as having a separate environment processor 403 and a multipoint control unit 401, it is apparent to those of ordinary skill in the art that the functions of the environment processor 403 may be performed by the multipoint control unit 401 without departing from the spirit and scope of the present invention. In such a case, there is no need to include the environment processor 403 and the video conference apparatus 150 would include only the necessary interfaces and the multipoint control unit 401.

Similarly, the above embodiments describe the present invention as having separate user and environment databases 132 and 142. However, as is apparent to those of ordinary skill in the art, the information stored in the user and environment databases 132 and 142 may be combined into one database. Accordingly, there would be no need for both an environment database interface 405 and a user database interface 404 in the video conference apparatus 150. Only a single database interface would be necessary.

Further, while the above embodiments describe the selection of an alternative environment using thumbnail displays, the selection of an alternative environment may be facilitated by other means. For example, the selection may be made from a directory listing of environment names. The selection may also be made by cycling through each of the environments as a full screen display. In short, any means that provides for the selection of alternative environments may be used without departing from the spirit and scope of the present invention.

As shown in FIG. 4, the method of this invention is preferably implemented on a programmed processor. However, the video conference apparatus 150 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowchart shown in FIG. 7 can be used to implement the video conference apparatus functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of processing a video conference image received from a user device over a network, comprising:
   receiving video conference signals from the user device through the network, the video conference signals containing identifying information that identifies the user device;
   retrieving user video conferencing information from a database based on the identifying information in the video conference signals;
   retrieving an environment from another database, based on the user video conferencing information; and
   superimposing a sub-image contained in the received video conference signals with the retrieved environment in order to generate a video conference image for use in a video conference, whereby the sub-image appears to be located in the retrieved environment.

2. The method of claim 1, wherein the user video conferencing information includes at least one of a preferred environment and a list of available environments.

3. The method of claim 2, further comprising sending signals for displaying the list of the available environments to the user device.

4. The method of claim 3, wherein the list of available environments displayed on the user device includes a thumbnail display of each of the available environments.

5. The method of claim 2, wherein if the user video conferencing information includes a preferred environment, then the method further comprises:
   sending signals to the user device for displaying a verification request message requesting that the user device send verification to use the preferred environment.

6. The method of claim 5, wherein if verification is not received, the method further comprises:
   retrieving the list of available environments from the database and sending signals to the user device to display the list of available environments.

7. The method of claim 3, further comprising:
   receiving signals from the user device indicating a selected environment from the displayed list of environments to be retrieved.

8. The method of claim 7, further comprising:
   receiving signals from the user device indicating a party with which the selected environment is to be used; and
   using the selected environment with the indicated party during the video conference.

9. The method of claim 8, further comprising:
   receiving signals from the user device indicating a second selected environment from the displayed list of environments;
   receiving signals from the user device indicating a second party with which the second selected environment is to be used; and
   using the second selected environment with the second party during the video conference.

10. The method of claim 1, wherein the source is a database.

11. The method of claim 1, wherein the source is a video camera.

12. The method of claim 1, wherein the source is remote from the user.

13. A video conference apparatus that processes a video conference image received from a user device over a network, comprising:
    a control unit; and
    an environment processor, wherein:
    the control unit receives video conference signals from the user device through the network, the video conference signals containing identifying information that identifies the user device;
    the control unit retrieves user video conferencing information from a database based on the identifying information in the video conference signals;
    the environment processor retrieves an environment from another database, based on the user video conferencing information; and
    the control unit superimposes a sub-image contained in the received video conference signals with the retrieved environment in order to generate a video conference image for use in a video conference, whereby the sub-image appears to be located in the retrieved environment.

14. The video conference apparatus of claim 13, wherein the user video conferencing information includes at least one of a preferred environment and a list of available environments.

15. The video conference apparatus of claim 14, wherein the control unit sends signals to the user device for displaying the list of the available environments.

16. The video conference apparatus of claim 15, wherein the list of available environments displayed on the user device includes a thumbnail display of each of the available environments.

17. The video conference apparatus of claim 14, wherein if the user information includes a preferred environment, the control unit sends signals to the user device for displaying a verification request message requesting that the user device send verification to use the preferred environment.

18. The video conference apparatus of claim 17, wherein if the control unit does not receive verification, the environment processor retrieves the list of available environments from the database and the control unit sends signals to the user device to display the list of available environments.

19. The video conference apparatus of claim 16, wherein the control unit receives signals indicating a selected environment from the displayed list of environments to be retrieved by the environment processor.

20. The video conference apparatus of claim 19, wherein the control unit receives signals indicating a party with which the selected environment is to be used and the control unit uses the selected environment with the indicated party during the video conference.

21. The video conference apparatus of claim 20, wherein the control unit receives signals indicating a second selected environment from the displayed list of environments, receives signals indicating a second party with which the second selected environment is to be used, and wherein the control unit uses the second selected environment with the second party during the video conference.

22. The video conference apparatus of claim 13, wherein the source is a database.

23. The video conference apparatus of claim 13, wherein the source is a video camera.

24. The video conference apparatus of claim 13, wherein the source is remote from the user.

* * * * *